United States Patent
Mizzoni et al.

[15] 3,671,512
[45] June 20, 1972

[54] 6-AMINO-3-PYRIDINESULFONAMIDES

[72] Inventors: Renat Herbert Mizzoni, Long Valley R.D.; Herbert Morton Blatter, Summit, both of N.J.

[73] Assignee: Aba-Geigy Corporation, Summit, N.J.

[22] Filed: April 1, 1970

[21] Appl. No.: 24,869

[52] U.S. Cl. ............... 260/294.8 F, 260/294.8 R, 424/263, 424/266
[51] Int. Cl. ...................................................C07d 31/48
[58] Field of Search............................................260/294.8 F

[56] References Cited

OTHER PUBLICATIONS

Naegeli et al., Chem. Abstracts (I), Vol. 33, pp. 1733– 1734, (1939).
Naegeli, Chem. Abstracts (II), Vol. 34, pp. 1134, (1940).
Dohrn et al., Chem. Abstracts, Vol. 41, pp. 4809– 4811, (1947).

*Primary Examiner*—Alan L. Rotman
*Attorney*—Harry Goldsmith, Joseph G. Kolodny and Mario A. Monaco

[57] ABSTRACT

New 6-anilino-3-pyridinesulfonamides, e.g. those of the formula

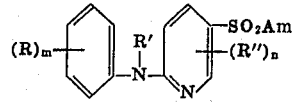

$R =$ H, alkyl, free, esterified or etherified OH, $CF_3$, $NO_2$, amino, free or functionally converted carboxy or sulfo
$R' =$ H, alkyl or acyl
$R'' =$ H or alkyl
$Am =$ an amino or hydrazino group
$m = 1-3$   $N = 1$ or $2$ the N-oxide and salts thereof, are antiinflammatory agents.

4 Claims, No Drawings

6-AMINO-3-PYRIDINESULFONAMIDES

SUMMARY OF THE INVENTION

The present invention concerns and has for its object the provision of new 6-anilino-3-pyridinesulfonamides and pharmaceutically useful derivatives thereof, preferably of those corresponding to Formula I

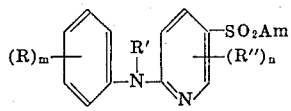

R = H, alkyl, free, esterified or etherified OH, $CF_3$, $NO_2$, amino, free or functionally converted carboxy or sulfo
R' = H, alkyl or acyl
R'' = H or alkyl
Am = an amino or hydrazino group
m = 1–3    N = 1 or 2

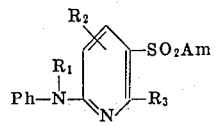

where Ph is a phenyl radical, $R_1$ is hydrogen, lower alkyl or an acyl radical, each of $R_2$ and $R_3$ is hydrogen or lower alkyl and Am is an amino or hydrazino group, of the N-oxide and pharmaceutically useful salts thereof, as well as of corresponding pharmaceutical compositions and of methods for the preparation and application of these products. Said compositions are primarily useful as anti-inflammatory agents.

DESCRIPTION OF THE PREFERRED EMBODIMENTS

The phenyl radical Ph is unsubstituted or substituted by one or more than one, preferably by up to three, advantageously one or two, of the same or different substituents selected from the group consisting of lower alkyl, e.g. methyl, ethyl, n- or i-propyl or -butyl, free, etherified or esterified hydroxy, such as lower alkoxy, e.g. methoxy, ethoxy, n- or i-propoxy or -butoxy, lower alkanoyloxy, e.g. acetoxy or propionyloxy, halogeno, e.g. fluoro, chloro or bromo, trifluoromethyl, nitro, amino, mono- or di-lower alkylamino or lower alkyleneimino, e.g. mono- or dimethylamino or -ethylamino, pyrrolidino or piperidino, free, esterified or amidated carboxy or sulfo, such as lower carbalkoxy or alkoxysulfonyl, carbamoyl, sulfamoyl, mono- or di-lower alkylcarbamoyl or -sulfamoyl, e.g. carbomethoxy, carbethoxy, methoxysulfonyl, mono- or dimethyl-carbamoyl or -sulfamoyl. The term "lower," referred to above and hereinafter in connection with organic radicals or compounds respectively, defines such with up to seven, preferably up to four, carbon atoms.

Preferred Ph radicals are phenyl, mono- or di-(lower alkyl)-phenyl, mono- or di-(lower alkoxy)-phenyl, mono- or di-(halogen)-phenyl, (halogeno, lower alkyl)-phenyl, (halogeno, trifluoromethyl)-phenyl, mono- or bis-(trifluoromethyl)-phenyl, (di-lower alkylamino)-phenyl, (carboxy)-phenyl, (lower carbalkoxy)-phenyl or (sulfamoyl)-phenyl.

The alkyl radicals $R_1$, $R_2$ and $R_3$ are preferably such with up to four carbon atoms, e.g. those mentioned above, especially methyl.

An acyl radical $R_1$ is preferably lower alkanoyl or alkenoyl, e.g. acetyl, propionyl, pivaloyl, acryloyl or methacryloyl, or Ph-lower alkanoyl or -alkenoyl, e.g. benzoyl, phenylacetyl or cinnamoyl.

The amino group Am is a primary, secondary or tertiary amino group, such as mono- or di-lower alkylamino or lower alkyleneimino, e.g. such mentioned above. A hydrazino group Am is also unsubstituted or lower alkylated, e.g. mono-, di- or trimethylhydrazino.

Salts of the primary or secondary amides are preferably those of therapeutically useful inorganic or organic bases, primarily the alkali metal or alkanine earth metal, e.g. sodium, potassium, magnesium or calcium salts. The basic compounds also form acid addition salts, preferably such of therapeutically useful inorganic or organic acids, for example, those of strong metalloidic acids, such as hydrohalic, e.g. hydrochloric or hydrobromic; sulfuric, phosphoric, nitric or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic embonic, nicotinic, methanesulfonic, ethanesulfonic, hydroxyethanesulfonic, ethylenesulfonic, halogenbenzenesulfonic, toluenesulfonic, naphthalenesulfonic or sulfanilic acid; methionine; tryptophane, lysine or arginine.

The compounds of the invention exhibit valuable pharmacological properties, primarily antiinflammatory effects. This can be demonstrated in animal tests using, for example mammals, such as rats as test objects. The compounds of the invention can be administered enterally, parenterally or topically, for example orally in the form of aqueous solutions or suspensions by stomach tube. The oral dosage may range between about 0.1 and 100 mg/kg/day, preferably between about 0.5 and 50 mg/kg/day, advantageously between about 1 and 25 mg/kg/day. Thus, the compounds of the invention cause, for example, in the rat paw edema test [Winter et al, Proc Soc. Exp. Biol. Med. 111, 544 (1962)] an inhibition of the paw edema induced by carrageenin. Accordingly, the compounds of the invention are useful antiphlogistics. They are also useful intermediates in the preparation of other valuable products, primarily of pharmacologically active compounds.

Preferred are those compounds of Formula I in which Ph is phenyl, mono- or di(lower alkyl)-phenyl, mono- or di-(lower alkoxy)-phenyl, mono- or di-(halogeno)-phenyl, (halogeno, lower alkyl)-phenyl, (halogeno, trifluoromethyl)-phenyl, mono- or bis-(trifluoromethyl)-phenyl, (di-lower alkylamino)-phenyl, (carboxy)- phenyl, (lower carbalkoxy)-phenyl or (sulfamoyl)-phenyl, $R_1$ is hydrogen, lower alkyl or alkanoyl, each of $R_2$ and $R_3$ is hydrogen or lower alkyl, and Am is amino, mono- or di-lower alkylamino or five to seven ring-membered lower alkyleneimino, or the alkali or alkaline earth metal salts of the compounds in which Am is amino or lower alkylamino or therapeutically useful acid addition salts thereof.

Especially valuable are the compounds of Formula I in which Ph is phenyl, mono- or dimethylphenyl, mono- or di-methoxyphenyl, mono- or dichlorophenyl, (chloro, methyl)-phenyl, (chloro, trifluoromethyl)-phenyl, mono- or bis-trifluoromethylphenyl, dimethylaminophenyl, carboxyphenyl, carbethoxyphenyl or sulfamoylphenyl, each of $R_1$, $R_2$ and $R_3$ is hydrogen or methyl and Am is amino, mono- or dimethylamino, the sodium or potassium salt of the compounds in which Am is amino or methylamino or therapeutically useful acid addition salts thereof.

Outstanding are compounds of Formula I, where Ph is phenyl, mono- or dimethylphenyl, chlorophenyl or trifluoromethylphenyl, each of $R_1$ and $R_3$ is hydrogen, $R_2$ is hydrogen or methyl and Am is amino.

The compounds of the invention are prepared according to methods in themselves known. Advantageously they are obtained by a. converting in a compound of the Formula II

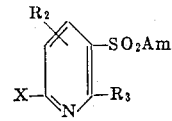

in which X is a group capable of being converted into the amino group $R_1$—N—Ph, or a salt thereof, X into said amino group or b) converting in a compound of Formula III

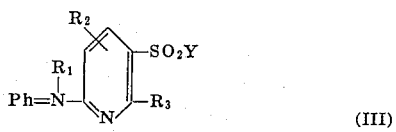

(III)

wherein Y is a group capable of being converted into the amino group Am, or a salt thereof, Y into said amino group and, if desired, converting any resulting compound into another compound of the invention.

The groups X or Y are, for example, a free or preferably a reactively etherified or esterified hydroxy group, such as lower alkoxy or, above all, halogeno, e.g. such mentioned above, advantageously chlorine, or X is also a nitro group.

The above-mentioned starting material is advantageously reacted with the amine $R_4$—NH—PH or H—Am respectively, wherein $R_4$ is hydrogen or lower alkyl, preferably in the absence, but also in the presence of diluents, advantageously of such which are inert to the reagents and are solvents thereof, of catalysts, condensing agents and/or inert atmospheres, at low temperatures, room temperature or advantageously elevated temperatures, at atmospheric or superatmospheric pressure.

In the above reaction the amine reagent is advantageously used in excess, in order to neutralize any generated said. It may, however, also be used in equivalent amounts and in the presence of other condensing agents such as inorganic or organic bases, e.g. alkali metal carbonates or bicarbonates or tertiary nitrogen bases, for example tri-lower alkylamines, N,N-dimethyl-aniline or pyridine.

The compounds of the invention so obtained may be converted into each other according to known methods. For example, resulting compounds in which $R_1$ stands for hydrogen, may be reacted with a reactive ester of a corresponding alcohol, for example that of a hydrohalic or sulfonic acid or with a reactive functional derivative of a corresponding acid, such as a halide or anhydride thereof, e.g. acetyl chloride or acetic anhydride. Resulting acyl derivatives may be hydrolyzed, for example with the use of mild acidic or alkaline hydrolyzing agents, which prevent hydrolysis of the sulfonamide group. Resulting acidic compounds can be salified in the usual manner, i.e. by reaction with corresponding inorganic or organic bases, e.g. alkali metal or alkaline earth metal hydroxides or carbonates, or corresponding ion exchange preparations. Resulting bases can also be converted into acid addition salts by reacting them with the corresponding free acids, e.g. those mentioned above, or acidic ion exchange preparations.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a compound is referred to in this context, a corresponding salt is also intended, provided such is possible or appropriate under the circumstances. Resulting mixtures of isomers can be separated into the single isomers by methods in themselves known, e.g. by fractional distillation, crystallization and/or chromatography.

The invention further includes any variant of the present process in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly those starting materials should be used in the reactions of the invention that lead to the formation of those compounds indicated above as being especially valuable.

The starting material is known or, if new, may be prepared according to the methods illustrated in the examples herein. Compounds of Formula III wherein Y is hydroxy or lower alkoxy, as well as the ammonium, metal or acid addition salts thereof are new and are considered as additional subject matter of the present invention. They are prepared analogous to reaction (a) from the corresponding pyridine-3-sulfonic acids, their esters or salts.

The pharmacologically active compounds of the invention are useful in the manufacture of pharmaceutical compositions containing an effective amount thereof in conjunction or admixture with excipients suitable for either enteral, parenteral or topical application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and ointments or suppositories are advantageously fatty emulsions or suspensions. They may be sterilized and/or contain adjuvants, such as preserving, stabilizing, wetting or emulsifying agents, solutions promoters, salts for regulating the osmotic pressure and/or buffers. They may also contain other therapeutically valuable substances. Said pharmaceutical compositions are prepared according to conventional mixing, granulating or coating methods respectively and contain about 0.1 to 75 percent, preferably about 1 to 50 percent of the active ingredient.

The following examples illustrating the invention are not to be construed as being limitations thereon. Temperatures are given in degrees Centigrade and all parts wherever given are parts by weight.

EXAMPLE 1

The mixture of 3.75 g 6-chloro-3-pyridinesulfonamide and 38 ml 3-trifluoromethylaniline is stirred for 12 hours at 150° under nitrogen. After cooling, it is filtered and the residue recrystallized from ethanol-hexane, to yield the 6-(3-trifluoromethylphenylamino)-3-pyridinesulfonamide of the formula

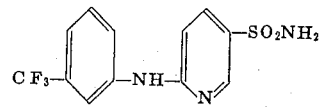

melting at 176°–178°.

EXAMPLE 2

The mixture of 8.5 g 6-chloro-5-methyl-3-pyridinesulfonamide and 30 ml 3-trifluoromethylaniline is stirred under nitrogen for 18 hours at 130° and 4 hours at 160°. After cooling, the mixture is diluted with diethyl ether, filtered and the residue recrystallized from ethanol-hexane, to yield the 5-methyl-6-(3-trifluoromethylphenylamino)-3-pyridinesulfonamide of the formula

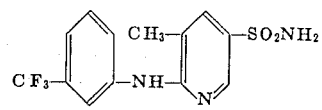

melting at 111°–112°.

The starting material is prepared as follows: To the suspension 23.5 g 6-amino-5-methyl-3-pyridinesulfonic acid in 375 ml 5 percent sulfuric acid, 15 g sodium nitrite are added during 45 minutes while stirring at 25°–35°. The resulting solution is slowly heated to 50°–60° and stirred for one-half hour. After cooling, the pH thereof is adjusted to 6.8 with sodium bicarbonate and the mixture evaporated in vacuo. The residue is taken up in hot dimethylformamide, the solution filtered, the filtrate concentrated in vacuo and the concentrate diluted with diethyl ether. The precipitate formed is filtered off, washed with diethyl ether and dissolved in hot 95 percent aqueous ethanol. The solution is filtered, the filtrate evaporated and the residue recrystallized from dimethylsulfoxide isopropanol and ethanol, to yield the sodium 6-hydroxy-5-methyl-3-pyridinesulfonate melting above 300°.

The mixture of 33.7 g thereof, 56.5 g phosphorous pentachloride and 35 ml phosphorus oxychloride is refluxed for 16 hours while stirring. After cooling, the mixture is poured into ice, the precipitate formed after one-half hour filtrated off, washed with water, dried and sublimated in vacuo, to yield the 6-chloro-5-methyl-3-pyridinesulfonyl chloride melting at 56°–57.

To the solution of 11.3 g thereof in 100 ml acetone, the mixture of 20 ml concentrated aqueous ammonia and 20 ml acetone is added dropwise during 1 hour while stirring at −30°. After 4 hours the mixture is allowed to warm to room temperature, filtered and the residue washed with acetone. The filtrate is refiltered, evaporated and the residue recrystallized from isopropanol, to yield the 6-chloro-5-methyl-3-pyridinesulfonamide, melting at 192°–193°.

EXAMPLE 3

According to the method described in the previous examples, the following compounds are prepared from equivalent amounts of the corresponding starting materials.
1. 6-(3-methylphenylamino)-3-pyridinesulfonamide;
2. 6-(2,3-dimethylphenylamino)-3-pyridinesulfonamide;
3. 6-(3-methoxyphenylamino)-3-pyridinesulfonamide;
4. 6-(2, 3 - or 4-fluorophenylamino)-3-pyridinesulfonamide;
5. 6-(2-, 3- or 4-chlorophenylamino)-3-pyridinesulfonamide;
6. 6-(3,5-dichlorophenylamino)-3-pyridinesulfonamide;
7. 6-(2-methyl-3-chlorophenylamino)-3-pyridinesulfonamide;
8. 6-(N-methyl-N-3-bromophenylamino)-3-pyridinesulfonamide; p1 9. 6-(3-carbethoxyphenyl)-3-pyridinesulfonamide.

EXAMPLE 4

Preparation of 10,00 tablets each containing 100.00 mg of the active ingredient:

Formula:
6-(3-trifluoromethylphenylamino)-
3-pyridinesulfonamide       1,000.00 g
Lactose                     2,535.00 g
Corn starch                 125.00 g
Polyethylene glycol 6,000   150.00 g
Talcum powder               150.00 g
Magnesium stearate          40.00 g
Purified water              q.s. 8.5

Procedure:

All the powders are passed through a screen with openings of 0.6 mm. Then the drug substance, lactose, talcum, magnesium stearate and half of the starch are mixed in a suitable mixer. The other half of the starch is suspended in 65 ml water and the suspension added to the boiling solution of the polyethylene glycol in 260 ml water. The paste formed, is added to the powders which are granulated, if necessary, with an additional amount of water. The granulate is dried overnight at 35°, broken on a screen with 1.2 mm openings and compressed into tablets using concave punches with 10.3 mm diameter, uppers bisected.

We claim:
1. A 6-anilino-3-pyridinesulfonamide of the formula

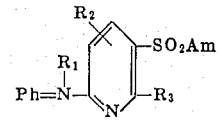

wherein Ph is mono- or di(lower alkoxy)-phenyl, mono- or di-(halogeno)-phenyl, (halogeno, lower alkyl)-phenyl, (halogeno, trifluoromethyl)-phenyl, mono- or bis-(trifluoromethyl)-phenyl, (di-lower alkylamino)-phenyl, $R_1$ is hydrogen or lower alkyl, each of $R_2$ and $R_3$ is hydrogen or lower alkyl and Am is an amino, mono- or di-lower alkylamino or five or seven ring-membered lower alkyleneimino, or the alkali or alkaline earth metal salts of the compounds in which Am is amino or lower alkylamino or pharmaceutically useful acid addition salts thereof.

2. A compound as claimed in claim 1, in which formula Ph is mono- or di-methoxyphenyl, mono- or dichlorophenyl, (chloro, methyl)-phenyl, (chloro, trifluoromethyl)-phenyl, mono- or bis-trifluoromethylphenyl, dimethylaminophenyl, each of $R_1$, $R_2$ and $R_3$ is hydrogen or methyl and Am is amino, mono- or dimethylamino, the sodium or potassium salt of the compounds in which Am is amino or methylamino or therapeutically useful acid addition salts thereof.

3. A compound as claimed in claim 1, in which formula Ph is chlorophenyl or trifluoromethylphenyl, each of $R_1$ and $R_3$ is hydrogen, $R_2$ is hydrogen or methyl and Am is amino.

4. A compound as claimed in claim 1, and being the 6-(3-trifluoromethylphenylamino)-3-pyridinesulfonamide.

* * * * *